US012305442B2

(12) United States Patent
Vianello et al.

(10) Patent No.: US 12,305,442 B2
(45) Date of Patent: May 20, 2025

(54) AUTOMATIC MACHINE AND AUTOMATIC METHOD FOR SEALING THE PERIMETRIC EDGE OF INSULATING GLASS CONSTITUTED BY GLASS PANES OF DIFFERENT DIMENSIONS

(71) Applicant: FOREL SPA, Treviso (IT)

(72) Inventors: Fortunato Vianello, Treviso (IT); Riccardo Vianello, Treviso (IT)

(73) Assignee: FOREL SPA, Treviso (IT)

( * ) Notice: Subject to any disclaimer, the term of this patent is extended or adjusted under 35 U.S.C. 154(b) by 694 days.

(21) Appl. No.: 17/279,779

(22) PCT Filed: Sep. 27, 2019

(86) PCT No.: PCT/EP2019/076284
§ 371 (c)(1),
(2) Date: Mar. 25, 2021

(87) PCT Pub. No.: WO2020/074284
PCT Pub. Date: Apr. 16, 2020

(65) Prior Publication Data

US 2021/0332637 A1 Oct. 28, 2021

(30) Foreign Application Priority Data

Oct. 12, 2018 (IT) ........................ 102018000009336

(51) Int. Cl.
*E06B 3/673* (2006.01)
*E06B 3/66* (2006.01)

(52) U.S. Cl.
CPC ........ *E06B 3/67347* (2013.01); *E06B 3/6617* (2013.01); *E06B 3/67391* (2013.01); *E06B 2003/67395* (2013.01)

(58) Field of Classification Search
CPC ............... E06B 3/67347; E06B 3/6617; E06B 3/67391; E06B 2003/67395; E06B 2003/67378; E06B 3/673; E06B 3/67343
See application file for complete search history.

(56) References Cited

U.S. PATENT DOCUMENTS

| | | | | |
|---|---|---|---|---|
| 6,197,231 | B1 | 3/2001 | Lisec | |
| 11,639,628 | B2 * | 5/2023 | Vianello | E06B 3/67343 156/107 |
| 2009/0205768 | A1 * | 8/2009 | Vianello | E06B 3/67343 156/107 |

FOREIGN PATENT DOCUMENTS

| | | | |
|---|---|---|---|
| DE | 19861288 | B4 * | 7/2005 |
| EP | 1655443 | A2 | 5/2006 |

(Continued)

OTHER PUBLICATIONS

DE19861288-B4 Bib Data and Abstract (Year: 2024).*

(Continued)

*Primary Examiner* — Cynthia L Schaller
(74) *Attorney, Agent, or Firm* — CANTOR COLBURN LLP

(57) ABSTRACT

A machine for the automatic sealing of the peripheral cavity of the insulating glass, which geometry is irregular for the planarity with regard to the theoretical one, comprising at least two glass panes having rectangular or other than rectangular shape and at least one spacer frame located in proximity of the perimeter at a finite distance from the boundary of the same glass panes or of the smaller glass pane, the glass panes being aligned or stepped along one or more or all peripheral sides and the thickness both of each glass pane, and of each spacer frame and consequently the total thickness of the insulating glass being mutable from insulating glass to insulating glass.

9 Claims, 16 Drawing Sheets

(56) References Cited

FOREIGN PATENT DOCUMENTS

| | | | |
|---|---|---|---|
| EP | 2093369 | A2 | 8/2009 |
| WO | 2019048268 | A1 | 3/2019 |

OTHER PUBLICATIONS

DE19861288-B4 Machine Translation of the Description (Year: 2024).*

International Search Report for corresponding application PCT/EP2019/076284 filed Sep. 27, 2019; Mail date Oct. 18, 2019.

* cited by examiner 1
2
2'
3

2
2'
2"
3
3'

5

4

2
5
2'

2
5
4
2'
5'
4'
2"

301

301
2"
2'

301
2'
2

301
2

AUTOMATIC MACHINE AND AUTOMATIC METHOD FOR SEALING THE PERIMETRIC EDGE OF INSULATING GLASS CONSTITUTED BY GLASS PANES OF DIFFERENT DIMENSIONS

TECHNICAL FIELD

The application is directed toward insulated glass and, more particularly, toward a machine for the automatic sealing of the peripheral cavity of the insulating glass having irregular geometry.

BACKGROUND

Currently it is known to deposit the rigid spacer frame 3 or the flexible spacer profile 4, pre-spread with butyl primary sealant and/or acrylic adhesive on a glass pane 2 and then couple the assembly to a second glass pane 2' and seal it by means of secondary sealant 5 along the entire cavity of the external peripheral region so as to constitute the so-called insulating glass 1. The operation can also be multiple in order to obtain the insulating glass 1 constituted by three glass panes 2, 2', 2" and two spacer frames 3, 3' or spacer profiles 4, 4', as well as n glass panes 2, 2, 2", 2'", etc., and n−1 spacer frames 3, 3', 3", etc., or spacer profiles 4, 4', 4", etc.

These glass panes 2, 2' etc. are often not aligned at the perimeter on one or more sides, since the insulating glass is designed for architectures in which typically the glass pane that is external (with respect to the building) is larger than the one that is internal (with respect to the building), in particular so that the external face of the building is constituted only by glass, while the internal glass pane or panes must leave space for the supporting structures and are therefore smaller. Furthermore, these glass panes 2, 2", 2'", etc., since they derive from upstream manufacturing processes, which despite being accurate are however not free from imperfections, may have irregular geometries as regards the dimensions and, as regards shape, especially in terms of planarity.

Sealing the perimetric cavity in situations in which the glass panes are aligned in some perimetric positions and are not aligned in other perimetric positions and moreover with a nonplanar geometry is a currently unsolved problem in the background art. The sealing nozzles either remain, albeit slightly, spaced from the face of the larger glass pane, with consequent leakage of sealant toward the face of the larger glass pane, contaminating it from the aesthetic and functional standpoint, or are pushed with an uncontrolled force against the larger glass pane and the latter can consequently be damaged, in particular if the face of said pane in contact with the nozzles is screen printed or painted.

The nonplanar geometry of glass panes, moreover, is regulated by standards that define the values thereof that are deemed allowable, which are presented as a function of the dimensions (base, height and thickness) and the type; said standards are for example the US standards ASTM C 1036-11 for flat glass panes, ASTM C 1048-12 for tempered glass panes, ASTM C 1172-14 for panes of laminated glass (also known as multilayer glass).

Accordingly, the nozzles must adapt to these nonplanarities, and this is already considered in a patent of the background art referenced hereinafter, which however does not perform it in a "soft" manner.

The present disclosure indeed deals with control of the force of approach of the nozzles against the face of the larger glass pane during sealing of the perimetric cavity and does so in the multiple conditions that can be present and generally are present even in combination within the same insulating glass 1, i.e., in situations that are variable along the perimeter, such as:

- aligned glass pane edges;
- offset glass pane edges, with offset extents of even just a few millimeters;
- nonplanarity of the glass panes;
- cantilever face of the larger glass pane provided with surface treatment such as screen printing or painting;
- and in situations with which the machine must interface easily, at the most by means of simple adjustment of some parameters, and specifically:
- insulating glass units of large size and therefore statistically composed of rather rigid panes;
- insulating glass units of small size and therefore statistically composed of rather flexible panes;
- glass panes composing the insulating glass in the most disparate types and conditions.

The most pertinent prior art for representing the state of the art is:

- PCT/EP2018/072908 in the name of the same Applicant FOREL SPA, currently in the confidential phase, but partially disclosed herein, having a priority dated 11 Sep. 2017;
- EP 1 655 443 B1 in the name of the same Applicant FOREL SPA having a priority dated 4 Nov. 2004.

In particular, these two documents are relevant because the present application constitutes an important improvement of the combination of these two prior art documents.

Other prior art documents generically deal with the sealing of the perimetric cavity of insulating glass panels and can represent well the field of application according to the present application; since this field is rather crowded with Industrial Property titles, one of them is cited by way of example and is the following:

- U.S. Pat. No. 6,197,231 B1 in the name of Peter Lisec, with priority dated 15 Oct. 1997.

The content of these disclosures can be summarized respectively as follows (the reference numerals of the details of the drawings are the ones used in each respective patent document).

PCT/EP 2018/072908

This patent application teaches to follow the nonplanarity of the glass panes by providing two solutions, either by mapping performed upstream of the sealing machine or by scanning performed by a sensor located in the sealing head during sealing and by feedback on the actuation system that actuates the Z axis that moves the nozzle closer to or further away transversely from the glass panes, and although it also shows among the configurations of the edge of the insulating glass panel the ones, in particular in FIG. 1E but also in FIGS. 1C and 1F, in which the glass panes 2M, 2'*m*, 2"*m* have different dimensions and therefore are offset on at least one of their sides, it does not deal with the issue of sealing related to the peripheral cavity and with how to adapt to different situations of aligned edged and non-aligned edges present in the same insulating glass. These figures are also enclosed substantially unchanged in the present application.

EP 1 655 443 B1

This patent discloses in its FIG. 8, which is presented here as FIG. 4, the method of approach of a particular configuration of the nozzle, i.e., the one used to spread sealant, not only in the cavity formed by the glass panes and by the extrados of the spacer frame 2 but also against the protruding part of the face of the glass pane 1M that is larger than the pane 1*m*. This approach is performed by means of the spring 113, which pushes the nozzle 110 against the glass pane 1M but, since the priority date is rather remote, by assuming and representing the geometry of the glass panes as perfectly flat, which is not the case in reality. Moreover, the description presents the floating part of the nozzle as being movable parallel to itself since it is guided by means of bushings 111 and pins 112 and therefore is unable to adapt to the inclination of the glass panes in the parts in which they are not flat. Furthermore, the method of pushing against the face 9 of the glass pane 1M by means of a spring, although feasible in the situation in which the glass panes are perfectly planar, instead entails a variable load in the case of nonplanar glass panes, since the spring delivers a force which is proportional to the displacement to which it is subjected, with consequent lack of uniformity of action and therefore with damage or lack of contact toward the face of the glass pane 1M in case of nonplanarity thereof.

U.S. Pat. No. 6,197,231 B1

This document, and many others not listed herein, does not even mention the real situations in which the glass panes are not sufficiently planar and the case in which the edges of the glass panes are mutually offset.

DISCLOSURE BRIEF SUMMARY

The summary description of the drawings and the detailed description of a way of carrying out the disclosure will clarify how the disclosure according to the present application is constituted and how it can be embodied.

DISCLOSURE DETAILED DESCRIPTION

Figure 10:
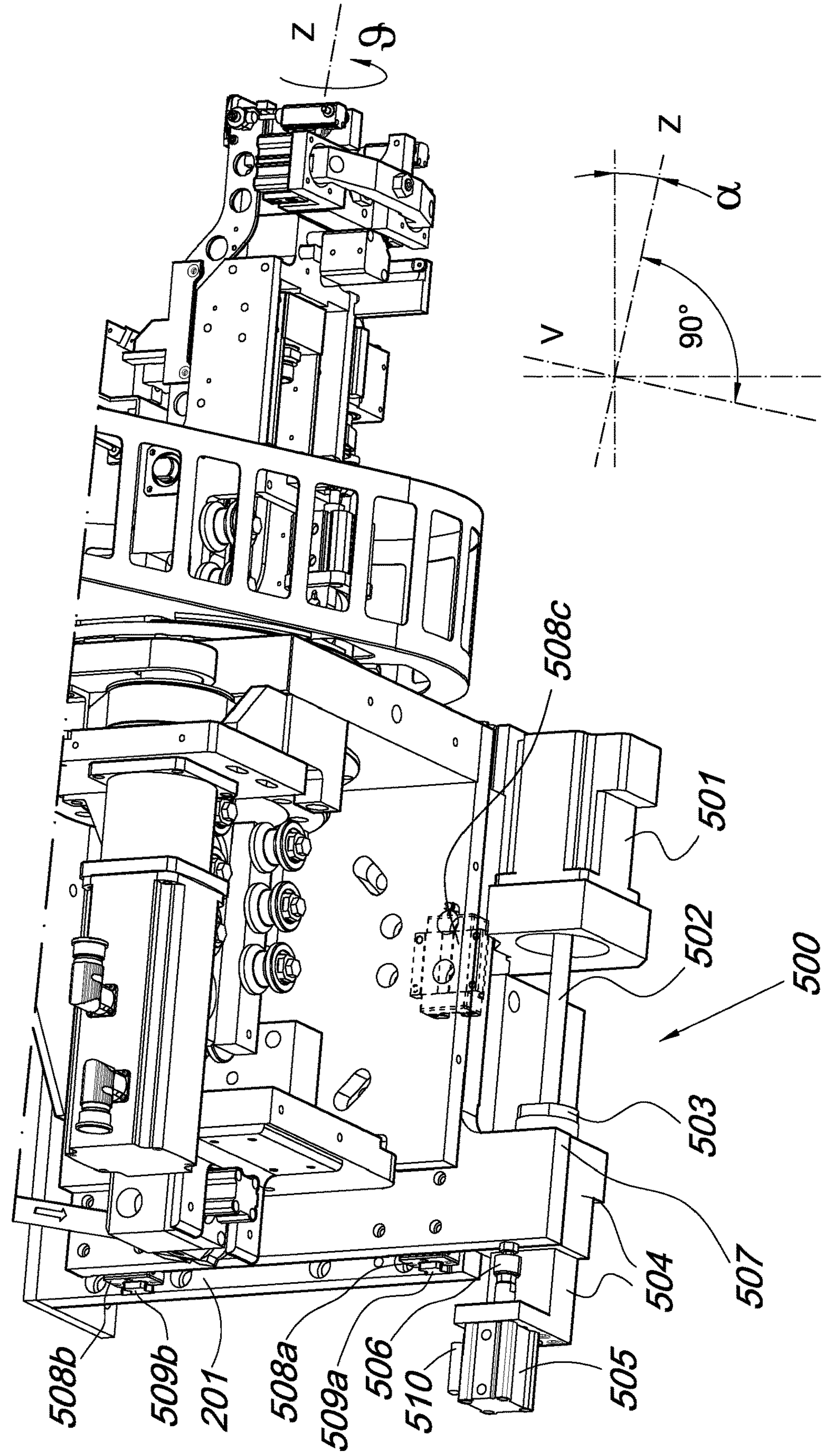
FIG. 10 is a perspective view of the devices for establishing a controlled and adjustable force of action of the sealing head and in particular of the sealing nozzle against the face of the glass pane that is offset with respect to the other glass pane.
Figure 11:
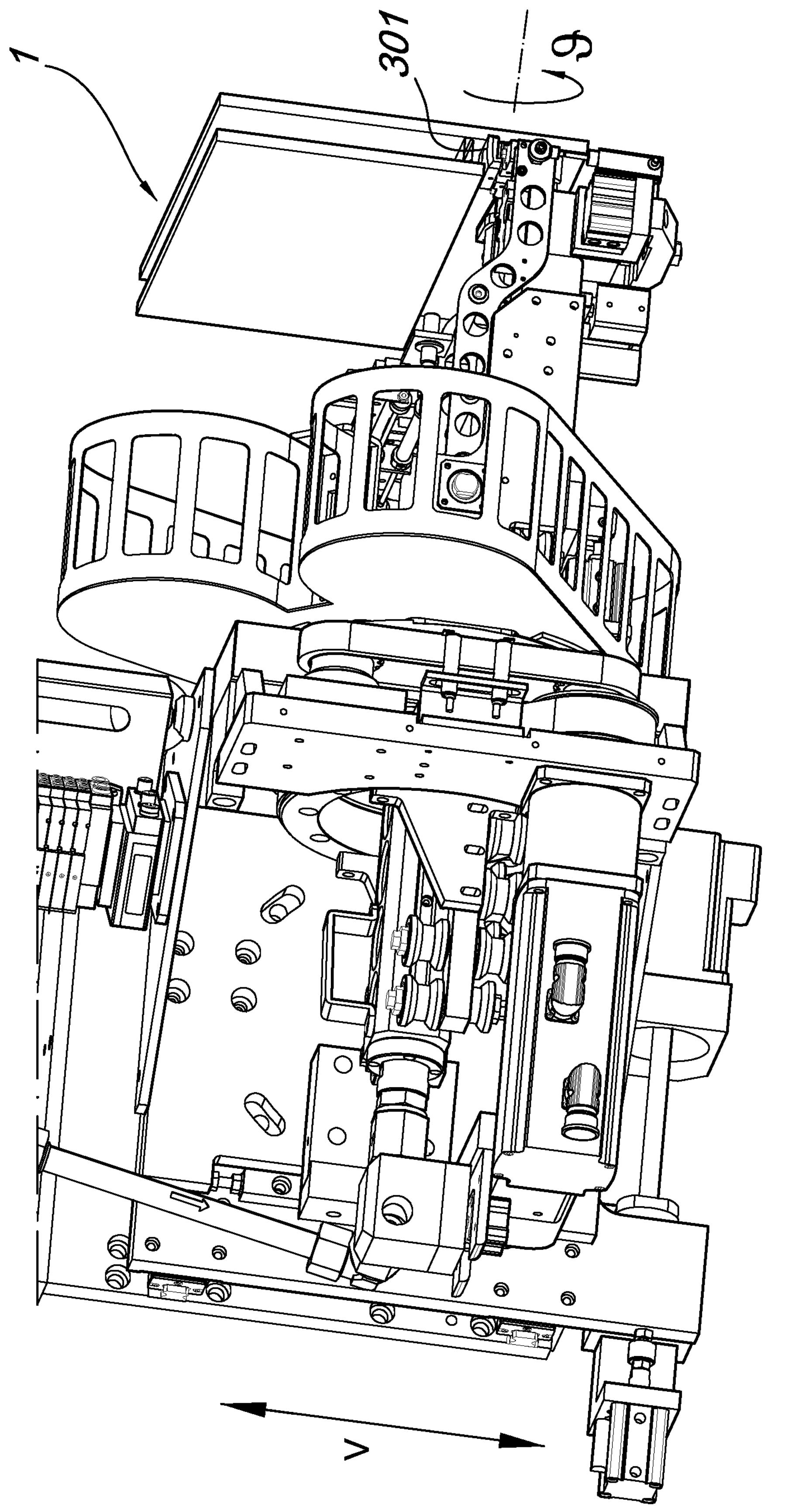
FIG. 11 completes FIG. 10, using a different orientation to show both the arrangement of the axes V, Z, θ and the details of the sealing nozzle of the suitable type and in the operating condition toward a perimetric joint, the one on the lower side of the insulating glass, which one of the two panes is offset with respect to the other one at least in one portion of the insulating glass.
Figure 12:
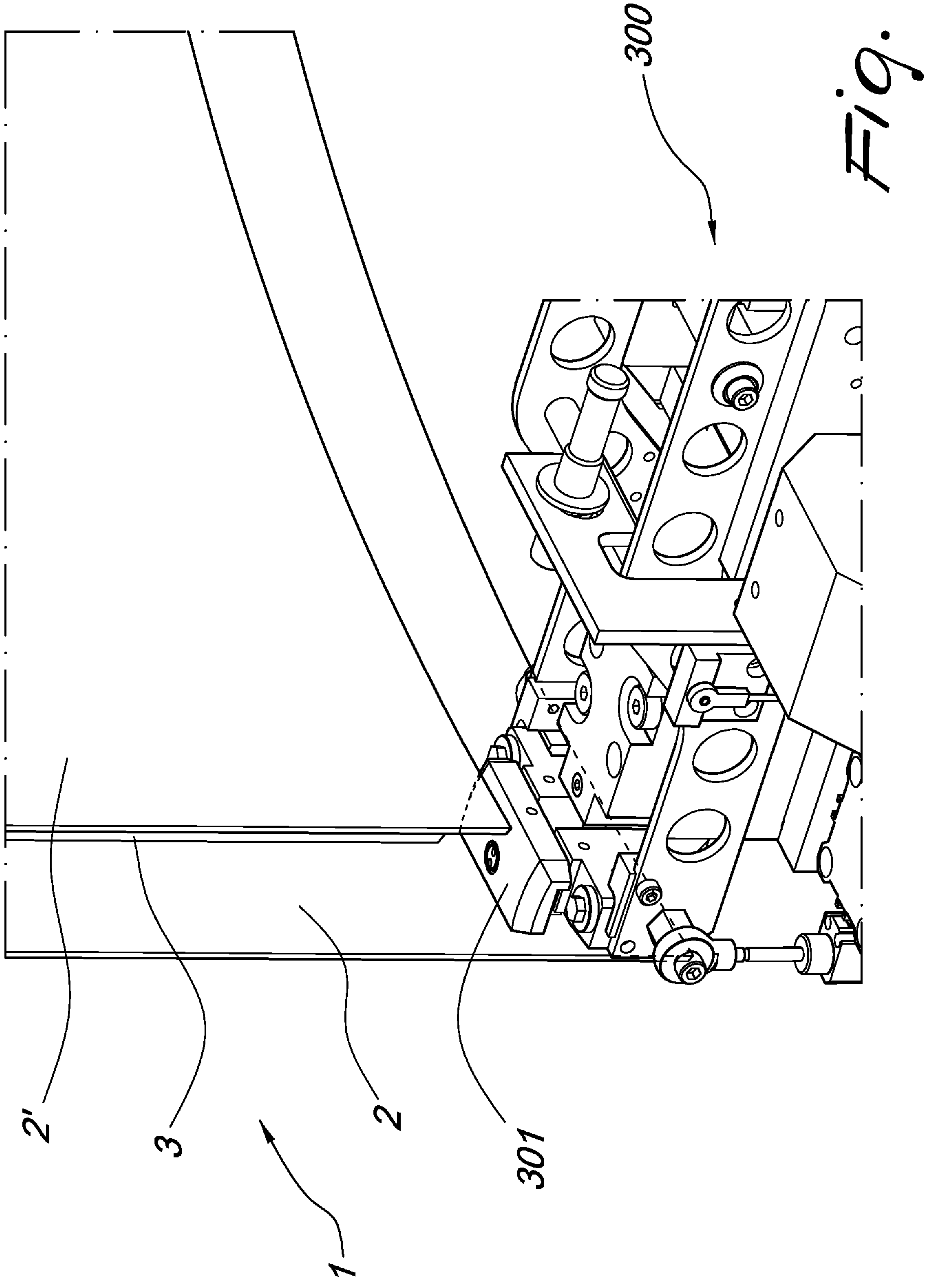
FIG. 12 is a schematic view of the principle of the approach of the nozzle against the face of the offset part of the glass pane, a principle which reconciles the requirements of following the nonplanarity, which is shown emphasized, of said glass pane and of applying toward said face a force within an appropriate range of values, let us call it “soft”, in order to solve the problems inherent in the background art, i.e., to avoid leaks of the sealant toward said face and damage of the surface of said face.

In order to describe one way of carrying out the disclosure, which comprises all the equivalent ones, reference is made to FIGS. 10, 11 for the assemblies and FIGS. 12-15*b* for the details.

The products: insulating glass 1, glass pane 2, 2', 2", 2''' etc., spacer frame 3, 3', 3" etc., 4, 4', 4", etc., and additional components thereof are identified by single-digit numbering, optionally provided with indices or letters. In particular, in order to distinguish the various possible shapes of the insulating glass, the reference numeral 1 designates the most frequent (rectangular) situation, the reference numerals 1' and 1' designates the situations that can be processed in any case with the devices according to the present disclosure (polygonal and mixed), the reference numeral 1" designates the (completely curvilinear) shape which is rarely requested and can be processed with the integration of devices, which are not innovative and therefore not described, by the present disclosure. In particular, both for an insulating glass production line that operates with a left-to-right direction and for an insulating glass production line that operates with a right-to-left direction, the reference numeral 1*a* designates the vertical side that is sealed first, the reference numeral 1*b* designates the upper horizontal side, the reference numeral 1*c* designates the vertical side that is opposite the preceding vertical one, the reference numeral 1*d* designates the lower horizontal side, which is the one that rests on the conveyors and is entrained by them. The various figures consider and provide a miscellany of both cases, since they are not significant.

The components that are separate but interfaced with the automatic sealing machine are designated by two-digit numbering.

The main components of the inventive device according to the present application, identified in the assembly 500 and of the known correlated devices identified in the assemblies 100, 200, 300, 400, are identified by three-digit numbering, optionally provided with indices or letters, wherein the ones that contain two zeroes relate to assemblies or units while the others refer to the respective component details.

Figure 17:
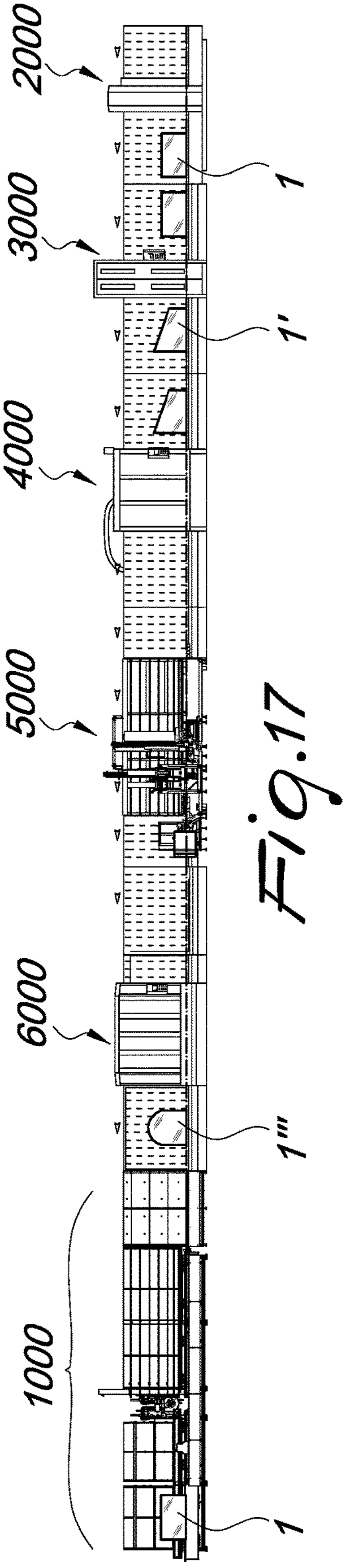
FIG. 17 is a view of an example of insertion of the automatic sealing machine in the line for the production of the insulating glass (seen from the side) and does not comprise: electrical/electronic panel, control post and protection devices.
Figure 18:
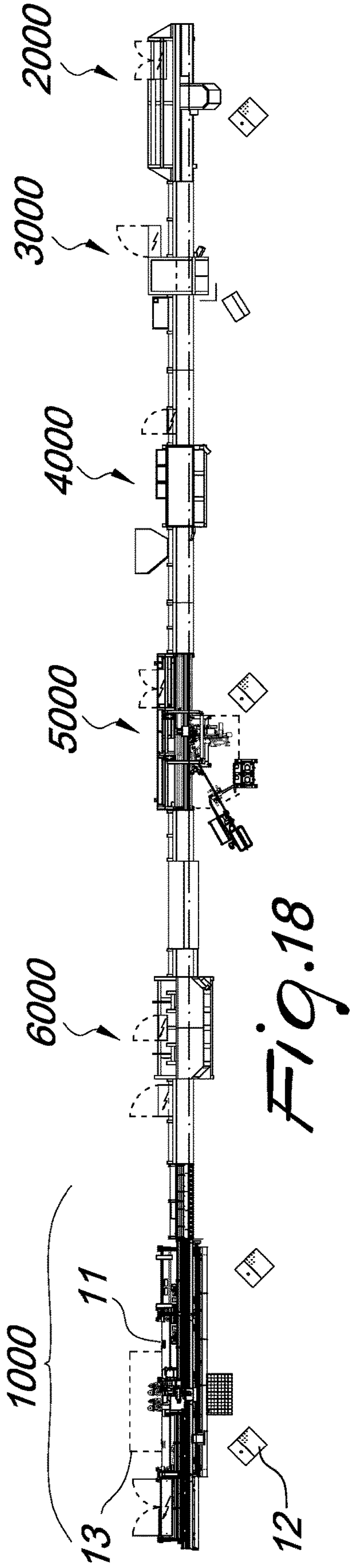
FIG. 18 is a view of an example of insertion of the automatic sealing machine in the line for the production of the insulating glass (seen in plan view) and includes: electrical/electronic panel, control post and protection devices, be they of the type of mechanical shields or optical barriers or laser barriers or electrosensitive mats, or zone scanners, etc., since particular attention is dedicated not only to the functional, qualitative, production aspects that are typical of the contents of the present disclosure but also to the aspects that relate to accident prevention.

The machines that belong to the production line of the insulating glass 1 are identified by four-digit numberings, in the order according to FIGS. 17 and 18, reserving the reference numeral 1000 for the automatic sealing machine and, in the example of said figures: the reference numeral 2000 for the machine that removes any nanotechnology coating in the band of the glass pane affected by the sealants; the reference numeral 3000 for the machine that performs any grinding of the edge of the glass panes; the reference numeral 4000 for the washer of the glass panes; the reference numeral 5000 for the applicator of the spacer profile; the reference numeral 6000 for the coupling unit/press.

Figures 1A, 1B, 1C, 1D, 1E, 1F:
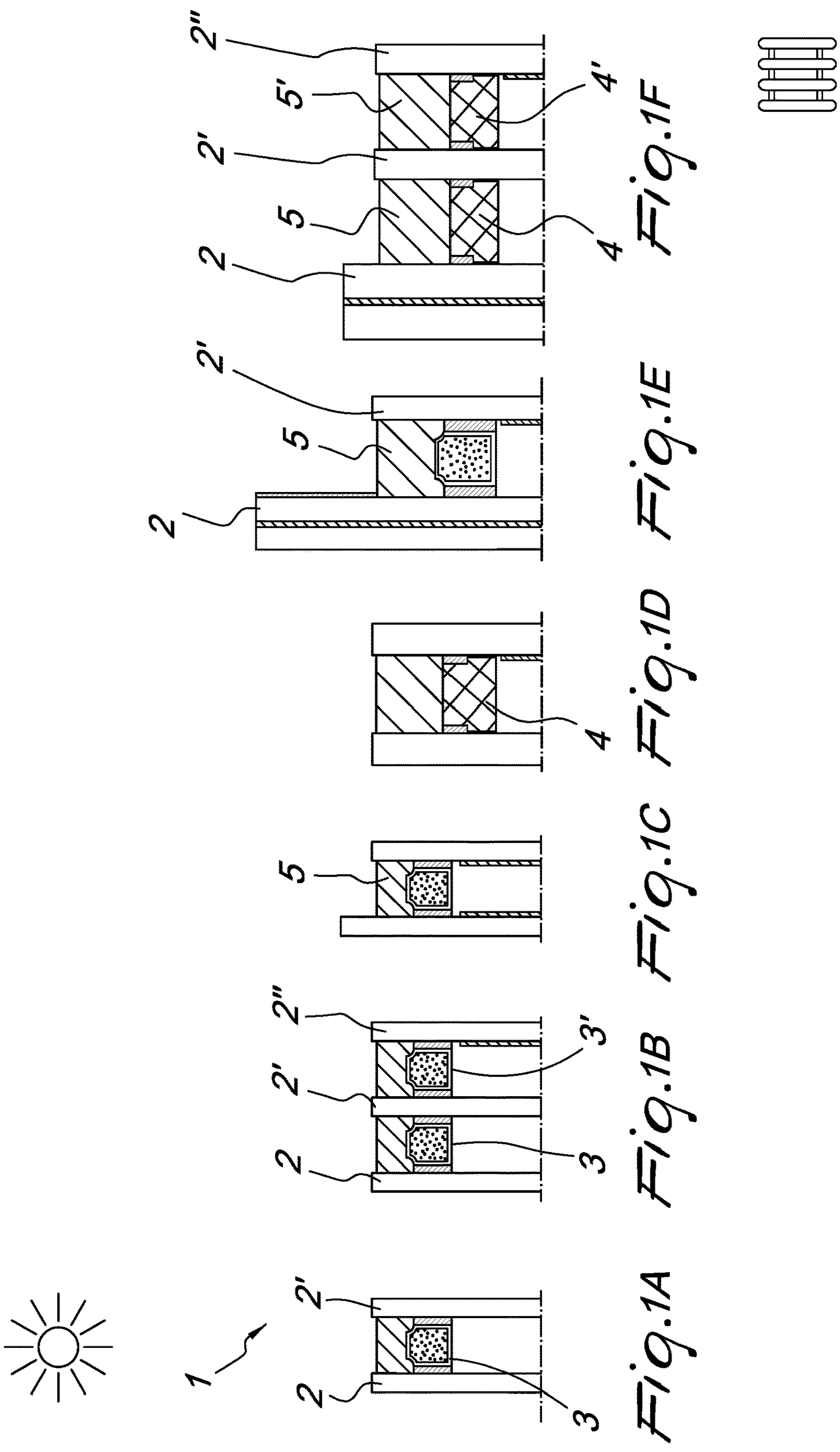
FIG. 1 is a schematic view of the peripheral portion, also known as joint, of the insulating glass in a non-exhaustive exemplifying series of possible combinations regarding the types of glass panes and of spacer elements: 1A normal; 1B triple glazing unit with internal glass with low-emissivity coating; 1C external glass with selective coating and offset with respect to the internal glass with low-emissivity coating; 1E laminated external glass pane, offset with respect to the internal glass pane with low-emissivity coating, the protruding part of the external glass pane is painted or screen-printed on its internal face; 1F laminated external glass pane, offset with respect to the remaining two glass panes, the internal one of which has a low-emissivity coating. Low-emissivity and selective coatings, obtained by means of nanotechnology processes, must be removed, as visible in the figures, in the portions of the faces of the glass panes that are affected by the sealants, since the oxidizing process that is triggered inevitably from the outside would compromise their bonding both with the glass and with the sealants. The internal/external orientation is identified visually with icons which represent the sun (external side) and the radiator (internal side). This non-exhaustive exemplifying diagram has the purpose of presenting the field of application of the disclosure as a complement to what has been presented in the description and in the preamble of claim 1. It applies both to the background art and to the new disclosure, the latter dealing in particular with the situations according to FIGS. 1C, 1E, 1F.
Figure 2:
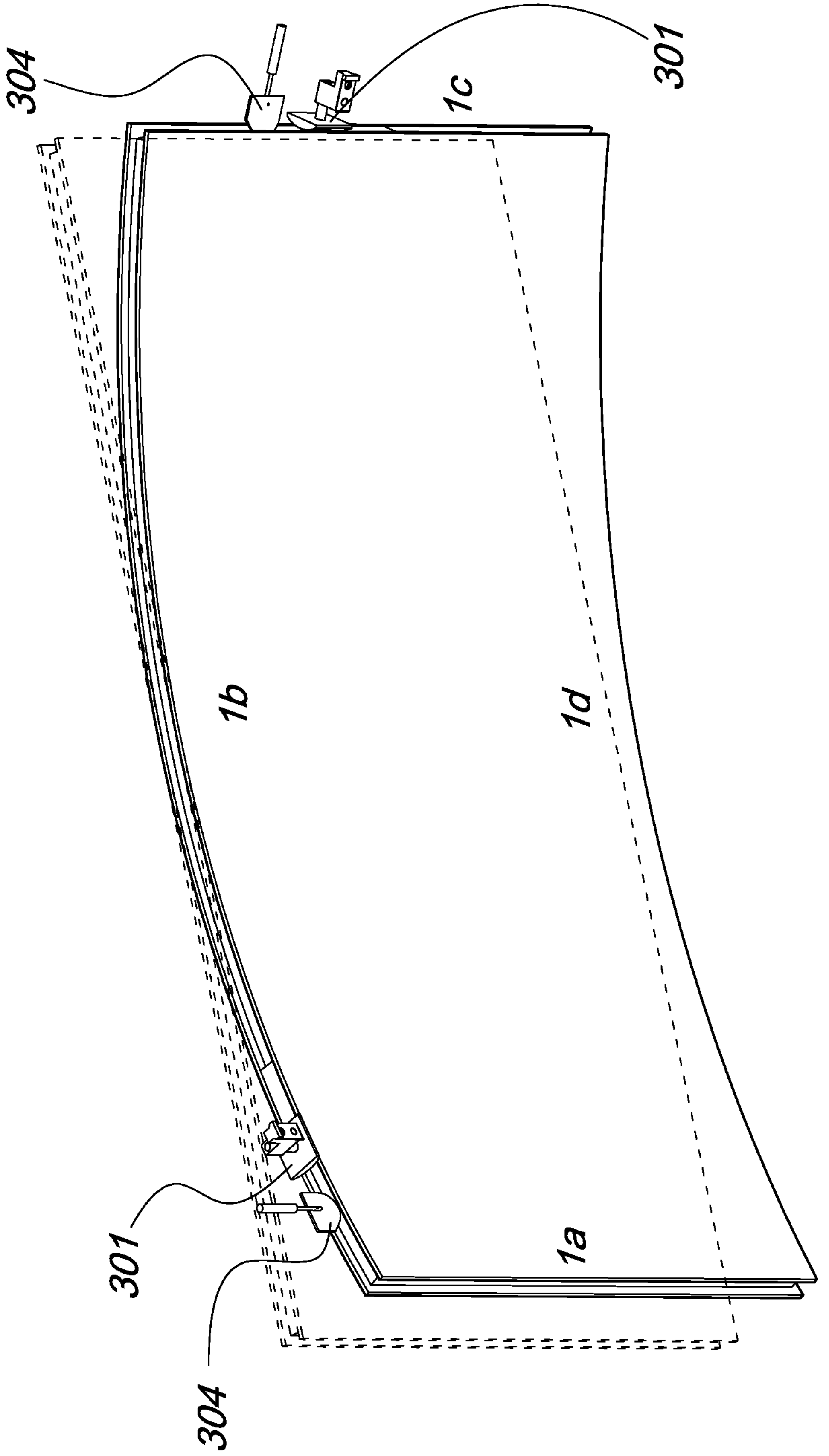
Fig. 2 PRIOR ART
FIGS. 2-4 show the background art for the part that relates to the filling of the perimetric cavity of the insulating glass with some numberings adapted for use in the description of the disclosure.
Figure 3:
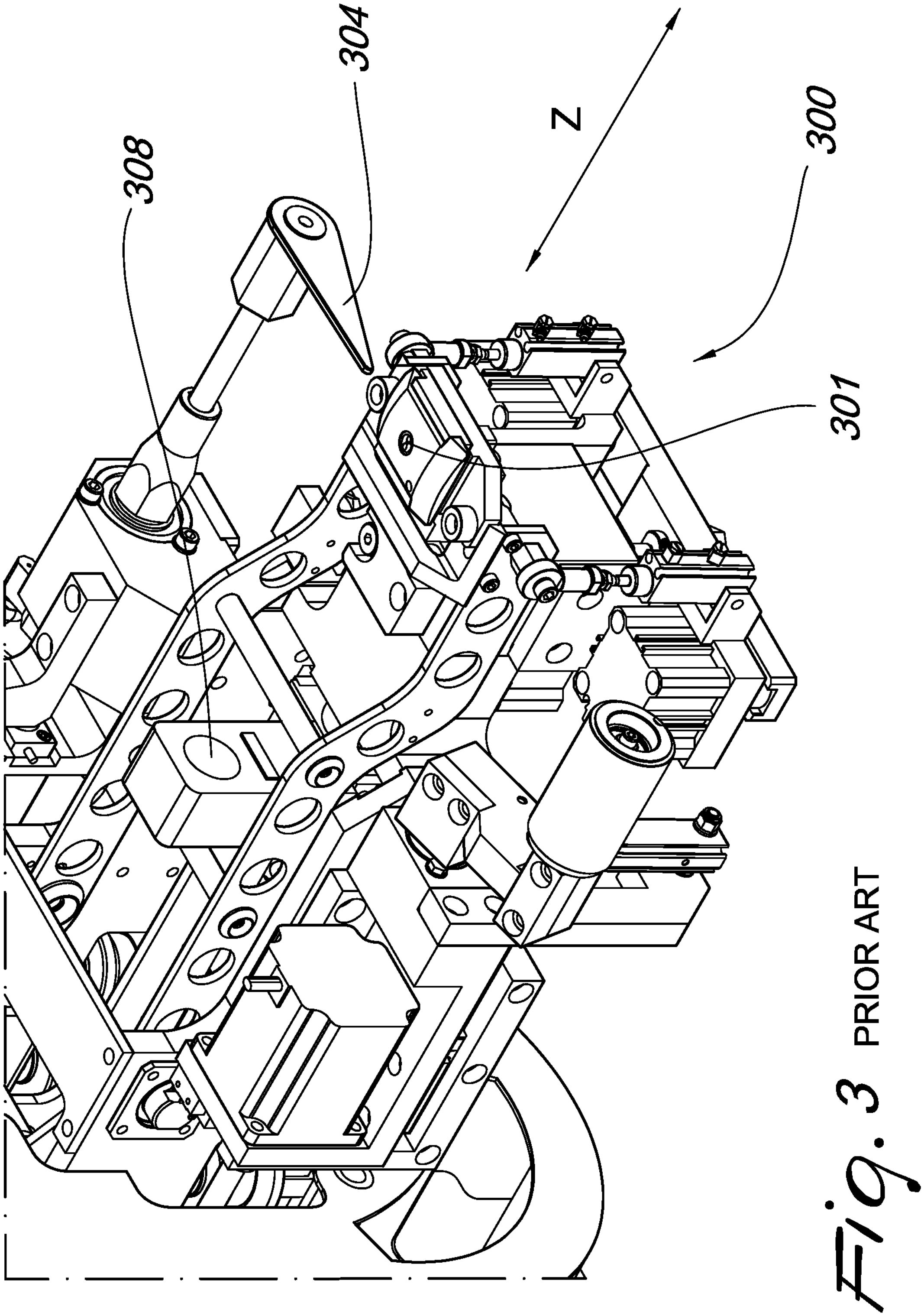
Fig. 3 PRIOR ART
Figure 4:
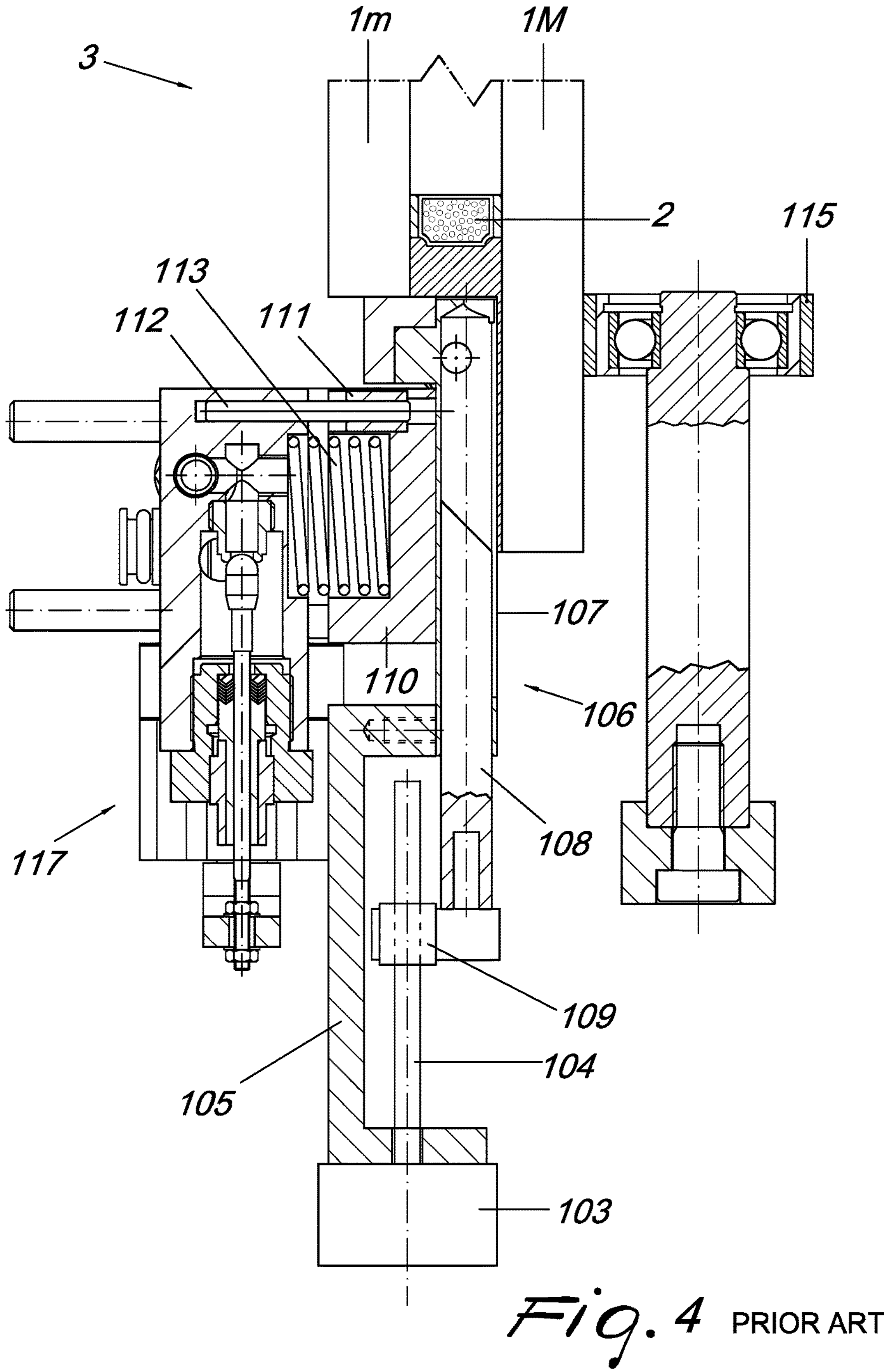
Fig. 4 PRIOR ART
Figure 5:
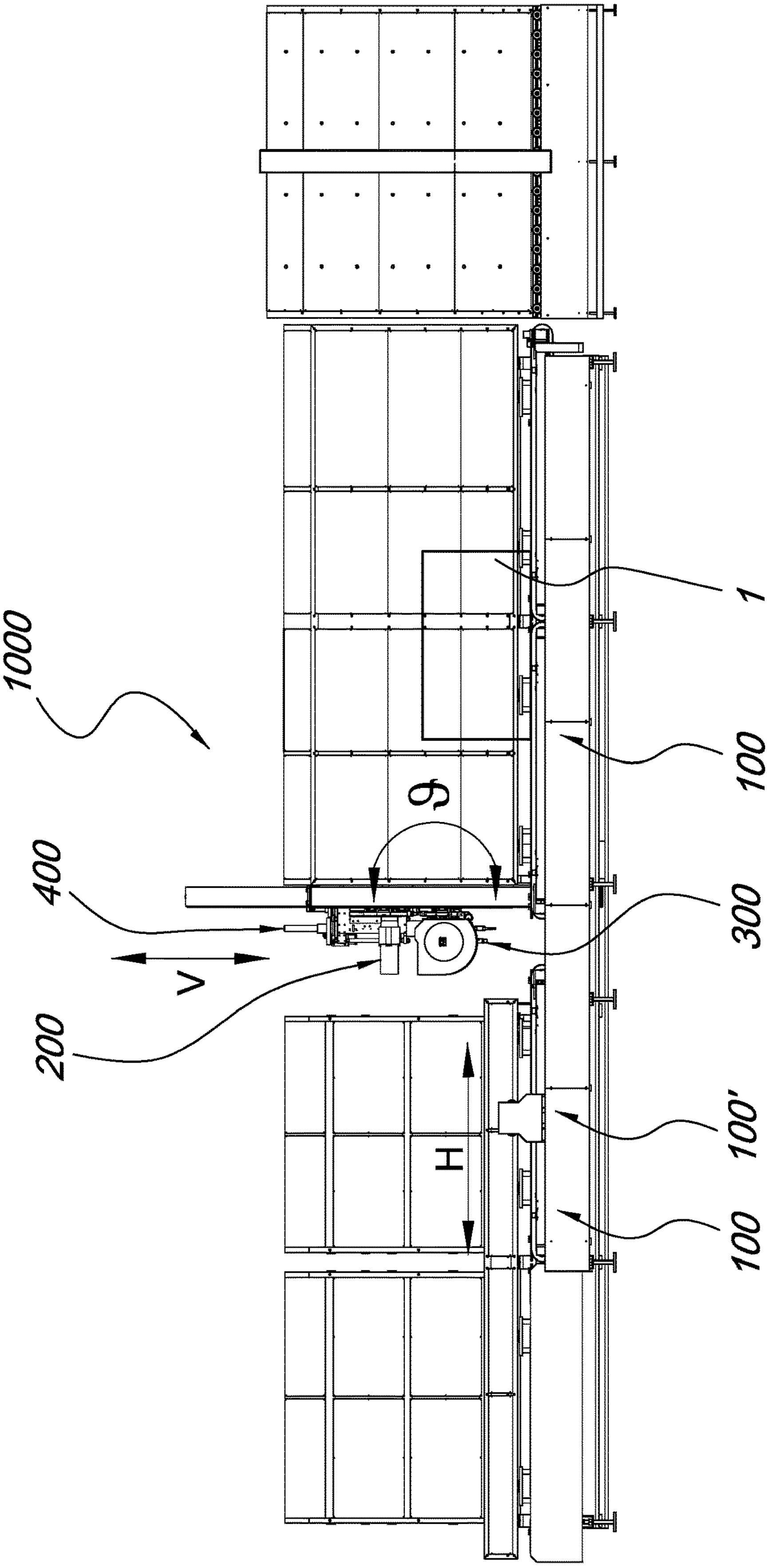
FIGS. 5-7 show the background art for the part that relates to the mutual movements between the insulating glass pane and the sealing nozzle.
Figure 6:
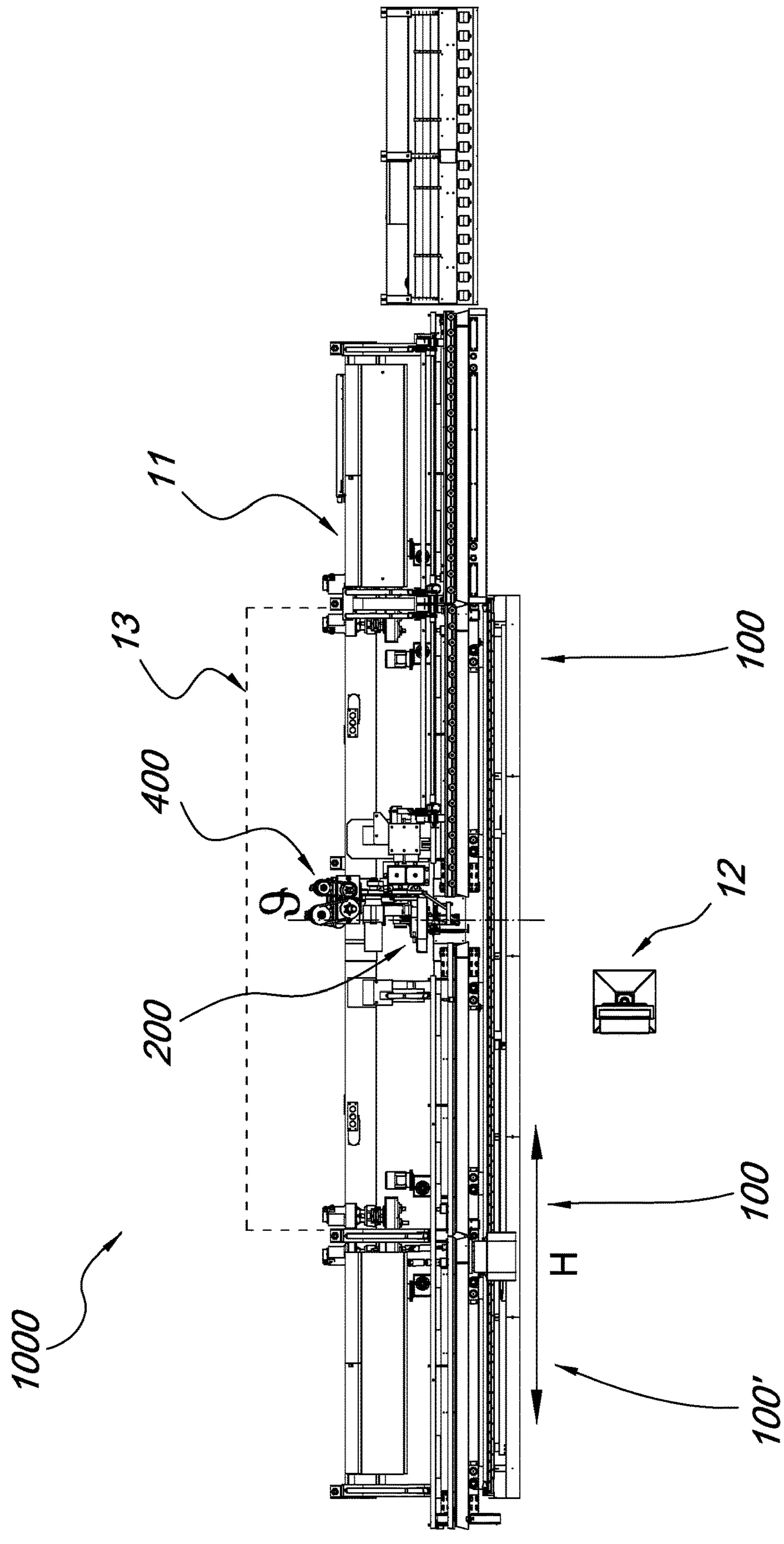
Figure 7:
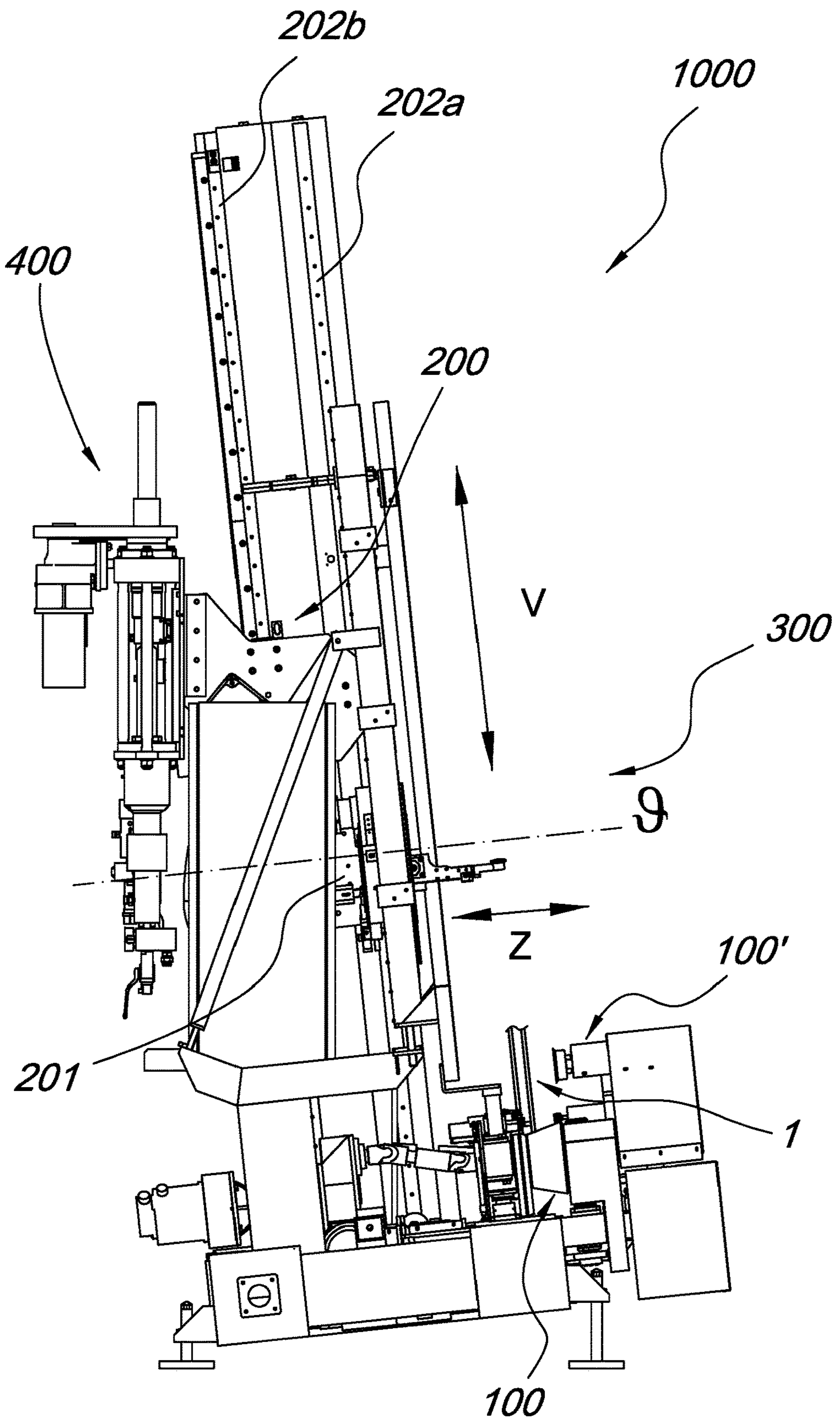

It should be stressed that the device and the method according to the present disclosure deal with the implementation of important improvements in the so-called SECOND SEALING or SECONDARY SEALING which provides the structural and functional coupling of the set of components: panes 2, 2', 2', 2''' etc., spacer frame 3, 3', 3" etc., 4, 4' 4" etc., at the perimeter, by means of polymeric sealants such as silicone, polysulfide, polyurethane, hot-melt, etc., fluids which are typically non-Newtonian and therefore have a complex rheology. The disclosure according to the present application relates in particular to new and innovative components to allow the operation of the machine that performs said sealing in the condition in which the insulating glass 1 as assembled, in the machine 6000, before sealing is not sufficiently planar and this by importing part of the solution of the prior art PCT/EP2018/072908 in the name of the same Applicant and especially in the condition, not solved in the background art, in which the sealing nozzle must provide a seal both against the perimetric edge of the smaller glass pane and against the face of the larger glass pane in the peripheral portions in which it is offset with respect to the smaller glass pane (cases shown in FIGS. 1C, 1E, 1F).

Leaving aside the steps of the process before the sealing operation that leads to the forming of the insulating glass panel to be sealed, since they are known and irrelevant with respect to the innovations introduced with the present disclosure, the description refers to the concepts of sealing to introduce the innovative modifications that commingle in the background art, in particular the nearest one according to PCT/EP2018/072908.

Figure 8A:
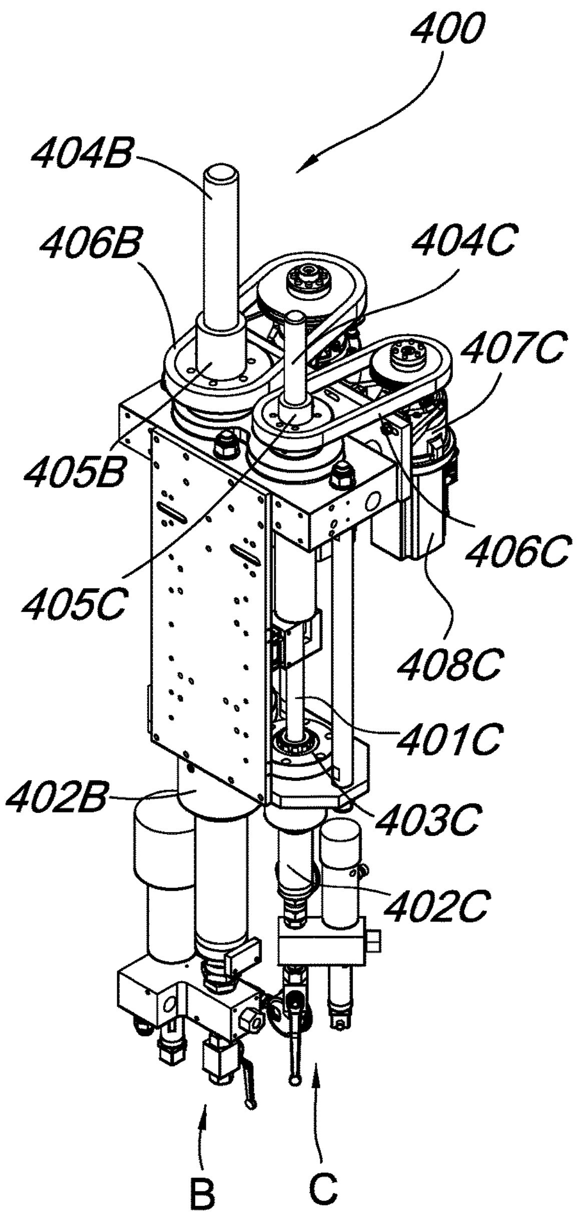
FIGS. 8*a*, 8*b* and 9 show the dosing units of the sealant product in the bi-component version (base+catalyst) and the corresponding principle of automatic adjustment that is adapted to fill the perimetric cavity of the insulating glass in a controlled and therefore uniform manner in the version with aligned glass panes.
Figure 8B:
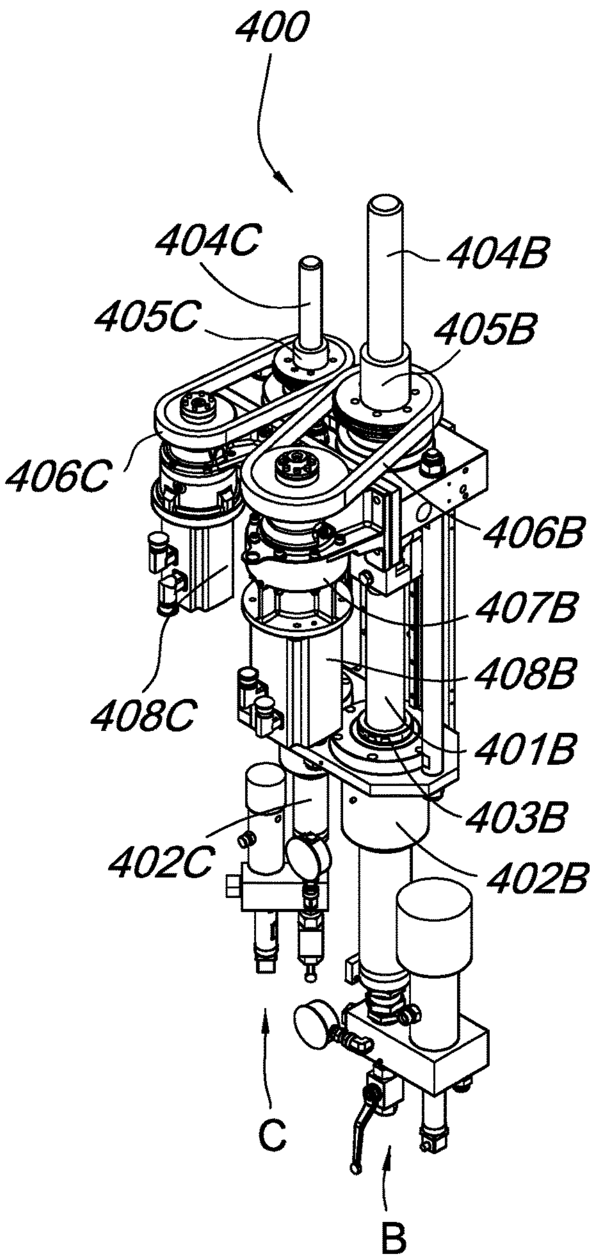
Figure 9:
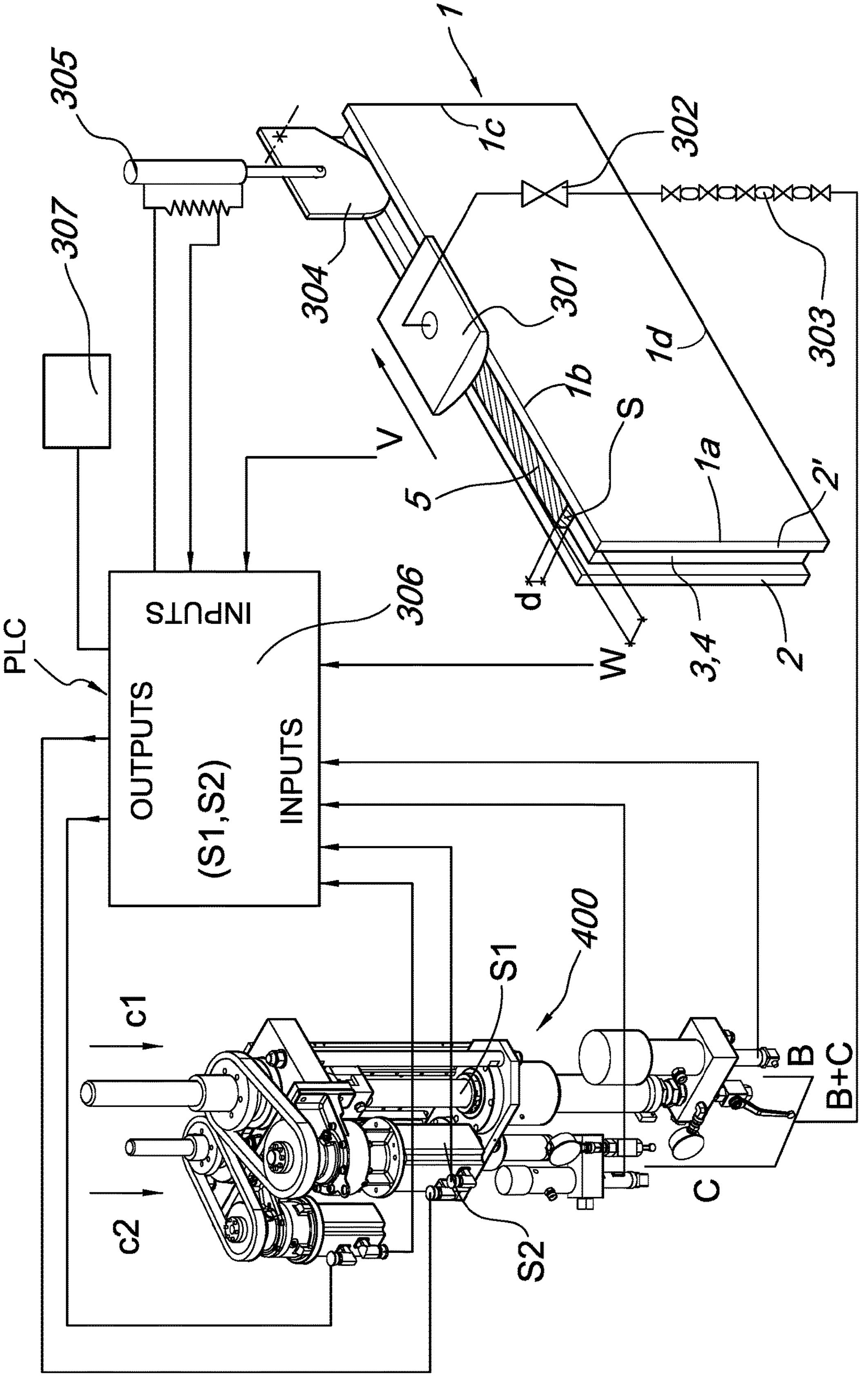

What is shown partially in FIGS. 2-9 or can be deduced from them as regards the sealing machine per se is also assumed to be known, and therefore not requiring a detailed description but only a summary one (since it is part of the background art), since the prior art described earlier and the numerous other prior art, as this field is very crowded with industrial property titles, as well as the knowledge of the person skilled in the art, do not require any clarification for the construction of these parts which relate to the automatic sealing machine, which are essentially constituted by the following assemblies: the reference numeral 100 for motion along the synchronous horizontal axis H of the insulating glass panel through its lower edge 1*d* (FIGS. 5, 6); the reference numeral 100' for motion along the synchronous horizontal axis H of the insulating glass panel 1 through its front face or through its rear face (FIGS. 5, 6); the reference numeral 200 for motion of the sealing head along the synchronous vertical axis (or rather pseudo-vertical, since it is slightly inclined with respect to the vertical by an angle $\alpha$) V (FIGS. 5, 7); the reference numeral 300 for the extrusion head, which rotates about the synchronous polar axis $\theta$ and is adjustable along the transverse axis Z (which is pseudo-horizontal, since it is slightly inclined with respect to the horizontal by an angle $\alpha$) and ends with the sealing nozzle 301 (FIGS. 5-7); the reference numeral 400 for the dosing unit assemblies (FIGS. 8*a*, 8*b* and 9).

A few details related to the background art are instead referenced as regards the path of the sealant 5, 5', 5", etc., since it is correlated with the function of filling the perimetric joint in the various configurations. This is to point out that the final operation of the filling of the cavity one 1, 1', 1", 1''' with high-quality aesthetic results constitutes a process that is complex from the point of view of the automatic adjustment principles, toward which the nonplanarity of the insulating glass and the offset between the glass panes only increase the complexity of the requirements of the functions required by the various devices. The sealants that are typically used are: silicone, particular for structural glazing; polysulfide; polyurethane; predominantly in the bi-component versions, i.e. the ones constituted by a base product plus a catalyst product, to be dosed and mixed and, in the final step, to be spread, filling the joint so as to constitute a geometry that is perfectly aligned with the borders of the glass panes and, as mentioned earlier, the rheology of sealants being complex.

The dosing assembly 400 is constituted by the dosing unit of the base product B and by the dosing unit of the catalyst product C which, being each in synchronous tie, can dispense the flow of the base product and the flow of the catalyst product in the stoichiometric ratio required by the manufacturer of the secondary sealant 5, 5', 5" etc. (typically 10:1 by volume, but any ratio is adjustable by means of simple inputs in the control panel 12). Obviously, in the case of mono-component sealant, the dosing unit is only one, since the catalyst product is not present.

The dosing unit of the base product comprises the following essential components: plunger or syringe 401B; cylinder or chamber 402B; seal 403B; recirculating ballscrew 404B; ballscrew nut 405B; mechanical transmission 406B, for example of the sprocket/chain type; mechanical reduction unit 407B; synchronous electric motor 408B. It is evident that these components are coupled partly to an upper plate and partly to a lower plate, said plates being connected by tension members, structural elements which are shared and used by the dosing unit B of the base product and by the dosing unit C of the catalyst product, as visible in FIGS. 8*a* and 8*b*.

The dosing unit of the base product comprises the following auxiliary components, all of which also belong to the background art: valves, pressure transducers, pressure gauges, protections against overpressures, etc.

The dosing unit of the catalyst product comprises the following components: plunger or syringe 401C; cylinder or chamber 402C; seal 403C; recirculating ballscrew 404C; ballscrew nut 405C; mechanical transmission 406C, for example of the sprocket/chain type; mechanical reduction unit 407C; synchronous and electric motor 408C, coupled as mentioned earlier.

The dosing unit of the catalyst product also comprises the auxiliary components as mentioned earlier.

In the case of mono-component sealant, the layout remains usable, but a single dosing unit is involved.

The operating logic of all of these components is shown schematically in FIG. 9, which is intuitive to interpret, on the dispensing side the flow rate of the dosing unit assembly being equal to c1×S1+c2×S2; where cl and c2 are respectively the speeds of the syringes of the base product and of the catalyst product, actuated by means of the actuations of the motors 408B and 408C, and S1 and S2 are the corresponding sections and on the destination side the same flow rate corresponding to the relative speed between the extrusion nozzle 301 and the side of the insulating glass 1, 1', 1'', 1''' multiplied by the section S of the perimetric joint, i.e. v×S. Where S is the product of the width w of the spacer profile 3, 4 by the distance d of its extrados from the margins of the glass panes 2, 2' as measured continuously by the probe 304, the position of which is feedbacked or retroacted by means of the potentiometer 305 toward the programmable logic controller (PLC) 306.

FIG. 9 shows other components, such as: the flow control valve 302; the mixer 303, for example of the static type, for the uniform mixing of the components B (base) and C (catalyst), adapted to obtain the sealant 5 which catalyzes by chemical reaction between the two components, said reaction typically occurring over 2÷3 hours; the operator interface (HMI) 307, arranged in the control post 12 for dialog with the PLC.

In detail, as regards the logic and power controls used to perform the dispensing of the sealant product at the nozzle 301, they are managed by the PLC 306, and the following are the main INPUTS and OUTPUTS:

INPUTS:

w=width of the spacer frame d=distance of its extrados from the margin of the glass panes v=relative speed of the peripheral region of the side of the insulating glass 1, 1', 1'', 1'''/extrusion nozzle 301 signals from the pressure transducers feedbacks from the synchronous motors 408B and 408C

OUTPUTS:

signals towards the actuation systems (not shown in the figure) of the synchronous motors, such as to embody the equation v×S=c1×S1+c2×S2.

Other parameters reside in the PLC, such as for example the sections S1 and S2 of the syringes, since they are constant data.

This description refers to the more complete case of the bi-component sealant. Obviously, it is applicable also to the case of the mono-component sealant, simply by eliminating the parts that describe the catalyst fluid.

For the sake of simplicity, FIG. 9 shows the case of the edge portions of the glass panes 2, 2' in the alignment condition; for the case of offset edge portions, to which the essence of the present disclosure is dedicated, for example as shown in FIGS. 14*a*-14*d* and 15*a*-15*b*, the equations remain unchanged and only the shape of the nozzle 301 changes.

Figure 15B:
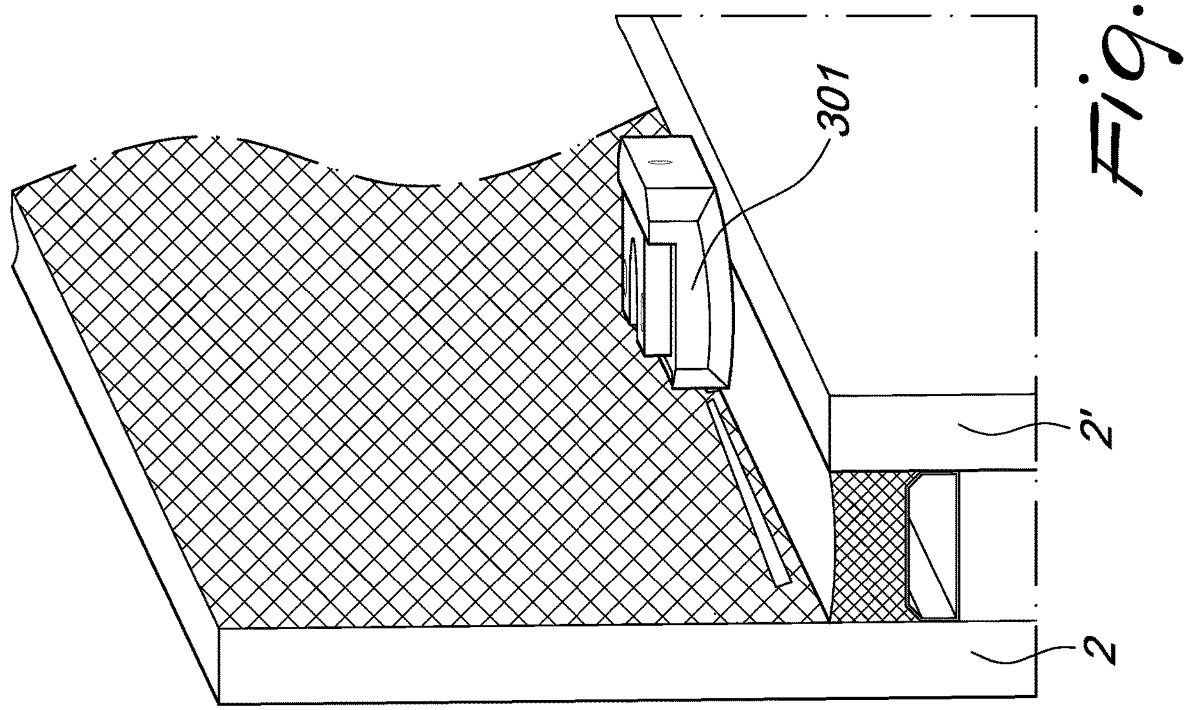
FIGS. 15*a*-15*b* show how the situations that are not solved in the background art lead to aesthetic, functional and structural defects such as to render the insulating glass product rated as defective and destined to be discarded (contamination or scratching).
Figure 15A:
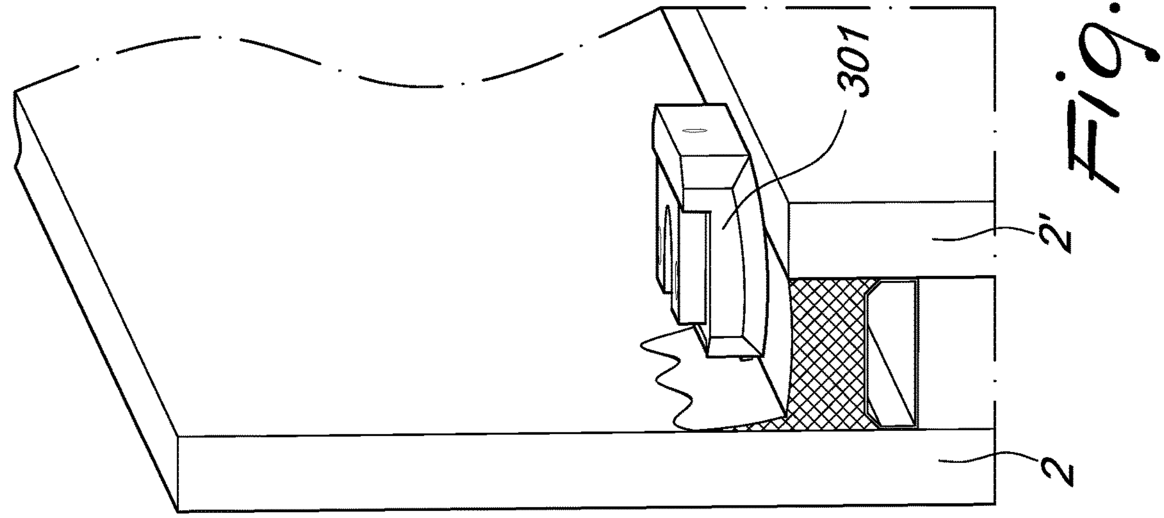
Figure 16A:
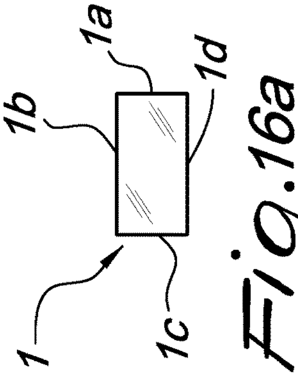
FIGS. 16*a*-16*d* show the shapes of the insulating glass units which can be processed in the machine according to the disclosure.
Figure 16B:
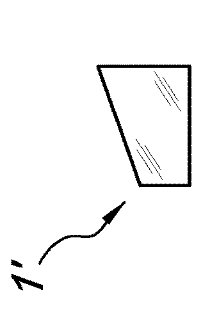
Figure 16C:
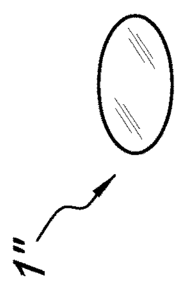
Figure 16D:
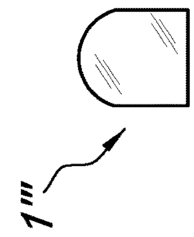

The innovative and therefore inventive part of the present application arises from the aim to eliminate the problems of the background art, which are fundamentally exemplified in FIGS. 15*a*-15*b*, but what has been devised must not be interpreted trivially as a solution that is obvious after the fact because instead it reconciles an innovative combination of groups of mechanisms in double feedback: along the axis Z, the first important assembly of the ones that actuate the following of the displacement of the perimetric cavity of the insulating glass, which is not geometrically planar due to the irregularities of the glass panes that constitute it, and, again along the axis Z, the second even more fundamental assembly of the ones that actuate the control of the thrust of the portion of the nozzle 301 against the protruding part of the face of the larger glass pane. This nozzle portion has the function of retaining the sealant 5 so that its border in the face of the protruding part of the glass pane is sharply defined and at the same level as the edge of the smaller glass pane.

In order to follow the nonplanarity of the insulating glass by means of the mechanisms of the first assembly, the principles of patent PCT/EP2018/072908 are used to, improving them, using for example a sensor 308 (FIG. 3) which, axially integral with the carriage 507 (FIG. 10) actuated along the transverse axis Z, detects the distance from the closest glass pane and together with the data entries of the PLC that bear the additional necessary information such as the thicknesses of the glass panes 2, 2', 2'', 2''' etc., the widths of the gaps 3, 3', 3'' etc., 4, 4', 4'' etc., and together with the program of the PLC itself make the PLC process the output for the actuator 501, which interacts between the body 201 of the vertical carriage 200, which runs on rails 202*a*, 202*b*, and the carriage 507, said actuator, by means of the ballscrew 502, the ballscrew nut 503, moves said carriage 507, which runs along the transverse axis Z by means of the ballscrew sliders 508*a*, 508*b*, 508*c* on the rails 509*a*, 409*b* of the body 201 of the vertical carriage, and with it the extrusion head 300 and therefore the nozzle 301, which is thus arranged in the optimum position for sealing as a function of the arrangement of the perimetric cavity or joint, which as already revealed can include both the aligned edges and the offset edges within the same insulating glass.

The second group of mechanisms intervenes between the ballscrew nut 503 and the carriage 507, i.e., the group that performs, synergistically with the first group, control of the thrust of the portion of nozzle 301 against the protruding part of the face of the larger glass pane. The first group in fact performs a geometric positioning, the precision of which derives: from the resolution of the signal of the sensor 308, from the control of the actuation systems, from the accuracy of the machining, from the plays, from the temperature, etc., and ends up having a resolution that is not better than ±0.5 mm, and this entails, in case of separation of the nozzle from the face of the glass pane, an outflow of the sealant toward said face with corresponding contamination, and in case of interference between the nozzle and the face of the glass pane, damage of the latter. The second group of mechanisms is constituted by the following components: body 504; pneumatic cylinder/compensator 505; stem 506; and, shared with the mechanisms of the first group, the carriage 507. The way of operating of the second group of mechanisms is as follows.

The body 504, in which the ballscrew nut 503 is coupled, is not rigidly integral with the carriage 507 but is interfaced with it by means of an elastic connection constituted by the "compensator" pneumatic cylinder 505, the stem 506 of which is screwed and locked on a part of the carriage 507. It is evident, therefore, that as a function of the pressures that can be established in the pneumatic cylinder 505 the sealing head 300, and with it the portion of the sealing nozzle 301 that is moving closer against the protruding part of the face of the larger glass pane, can apply a "soft" thrust against the face of the protruding part of the larger glass pane. It is even sufficient to work with the adjustment of the pneumatic pressure only in the chamber of the pneumatic cylinder on the stem side (the chamber of the so-called negative stroke). In fact, as shown in the diagram of FIGS. 10 and 11 and described regarding the background art, the mutually perpendicular axes V and Z do not have respectively vertical and horizontal arrangements but are slightly inclined with respect to them, typically by an angle $\alpha$ in the range of 6÷8°, since they are in alignment with the conveyors along which the insulating glass panels are translated along their production line, the standards of the machines directive prescribing a minimum inclination of 5 degrees for the stability of the transfers (plus an increase which is a function of any seismic loads). It is evident, therefore, that this inclination of the axis Z with respect to the horizontal, already naturally, i.e., by virtue of the action of the force of gravity, leads to a sliding (which originates on the carriage 507, which slides by means of the sliders **508*a*-508*c*, along the rails 509*a*, 509*b* of the body 201 of the vertical carriage 200) for descent and resting of the sealing head 300 and with it of the sealing nozzle 301 toward the face of the larger glass pane. Therefore it is the adjustment of the pressure in the negative chamber of the cylinder 505 that determines said resting force, since the component along the axis Z of the weight of the carriage 507 and of all the components installed therein, i.e., the ones that belong to the head 300, is in excess with respect to the force that one wishes to apply toward the face of the larger glass pane and therefore must be discharged by virtue of the action of said pressure, which acts in the pneumatic cylinder/compensator 505**, until the ideal resting force is obtained.

Figure 13:
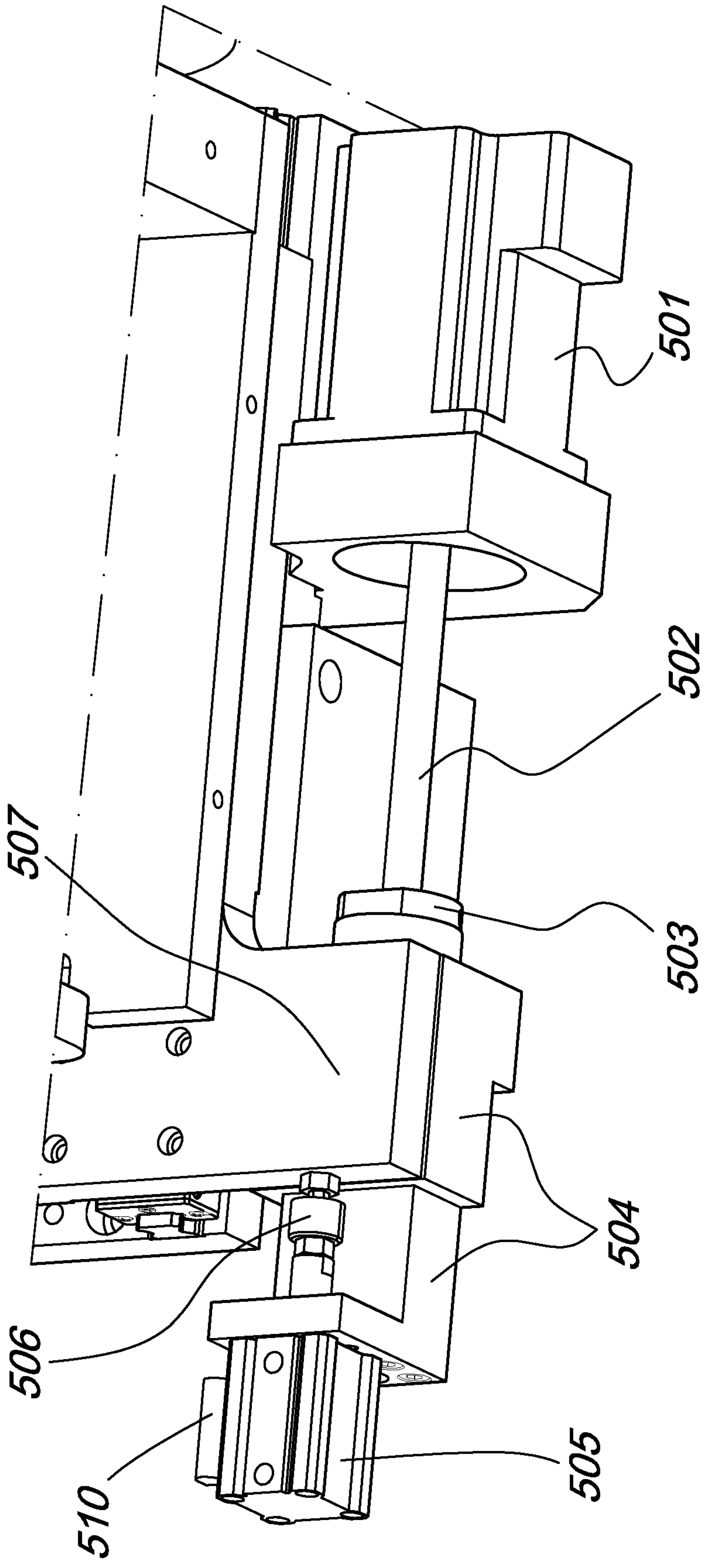
FIG. 13 shows, separating them from the known devices of the sealing head that are superfluous with respect to the inventive concept, all the components (actuator, potentiometer, mechanical parts, etc.) the interaction of which provides the “soft” operation shown in FIG. 12.
Figures 14A, 14B, 14C, 14D:
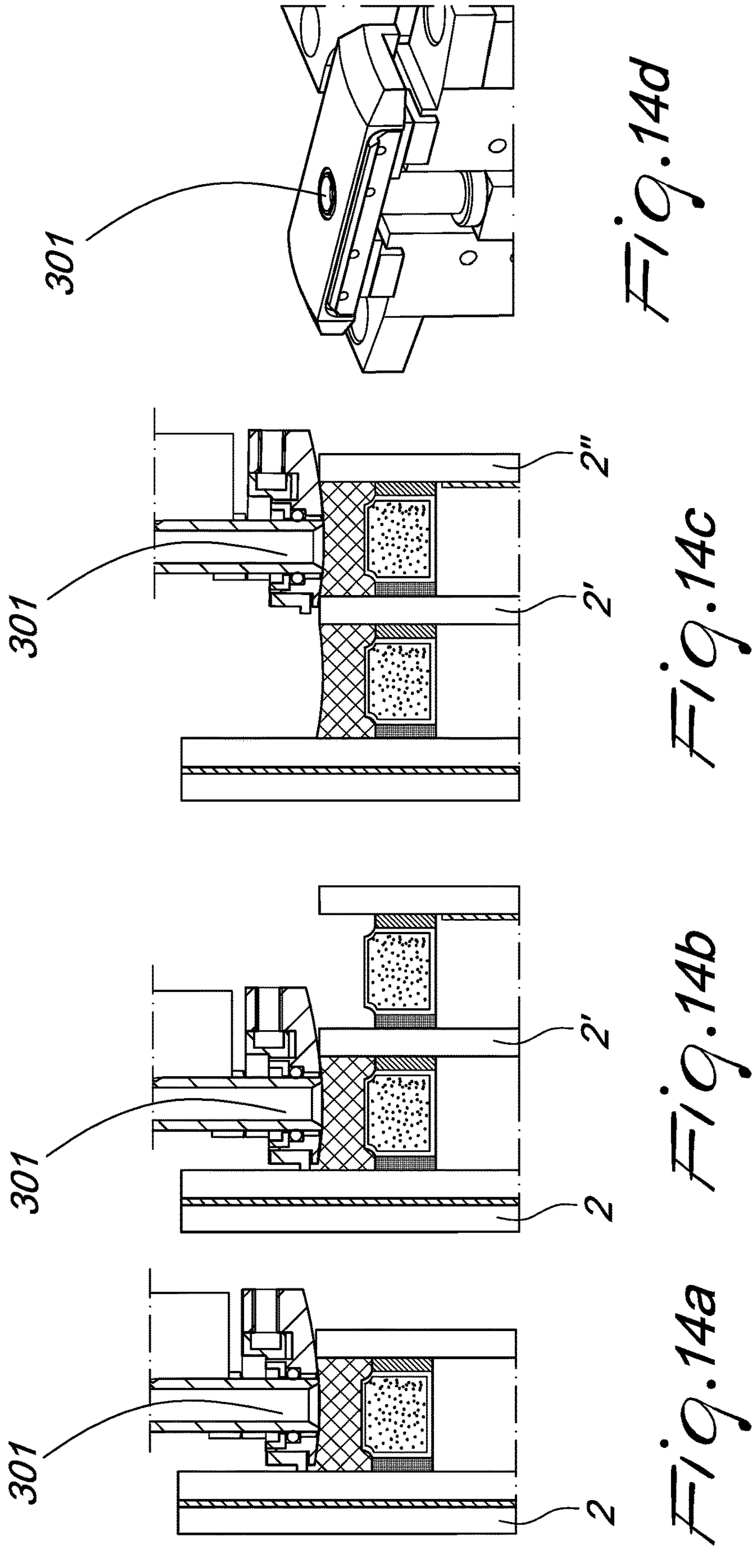
FIGS. 14*a*-14*d* are views of the various configurations of the insulating glass 1, limiting itself to the cases composed of two and three glass panes, which can be sealed without problems by virtue of the claimed device and method and shows a detail of the nozzle that highlights the lip which has the function of providing a seal toward the face of the protruding glass pane.

The component 510 shown in FIGS. 10 and 13 is constituted by a potentiometer which detects the position of the piston inside the pneumatic cylinder 505 and provides a feedback to the controller (PLC) 306 so that by means of the actuation of the actuator 501 a rather centered position of the pneumatic cylinder 505 with respect to the piston contained inside it is restored, so that there is a work range for the "soft damping" of the nozzle 301 toward the face of the larger glass pane. Otherwise, one would run the risk that if the piston reaches the negative stroke limit, the nozzle 301 detaches from the face of the larger glass pane and if it reaches the positive stroke limit the nozzle 301 presses excessively against the face of the larger glass pane.

In addition to the "soft damping" performed by the second group of mechanisms cited above, the coupling between the extrusion nozzle 301 and the extrusion head 300 is provided in a slightly articulated manner in order to follow any geometric irregularities of the edges of the glass panes and the nonplanar geometry of the insulating glass, and this is done to prevent the sealant 5 from escaping from the borders which must instead be hermetic between the involved parts of the nozzle and of the glass panes. This joint is of the spherical type in order to be able to perform oscillations both along an axis that is parallel to the face of the insulating glass and along an axis that is perpendicular to the face of the insulating glass.

In view of the wide range of the configurations of the cavities of the perimetric edge of the insulating glass to be filled with the sealant, obviously the nozzles 301 for the most frequent joint situations are provided with the machine, whereas they are designed accordingly for particular situations.

In all cases, the shapes of the nozzle 301 may be multiple, since they have to interface with at least the following situations of the perimetric joint of the insulating glass, as shown by way of partial example in FIGS. **14*a*-14*d*:**

edges aligned along the entire perimeter;
edges not aligned along the entire perimeter with equal offset;
edges not aligned along the entire perimeter with differentiated offsets;
edges aligned in some perimeter portions and not aligned in others;
combinations of the situations cited above with rectangular or nonrectangular shapes of the insulating glass;
combinations of the situations cited above with a depth of the cavity of the joint that is constant or different in the various perimeter portions and optionally is recessed in its external extrados with respect to the margin of the smaller glass pane.

Since the most frequent situation is the one for which the nozzle 301 must work within the same insulating glass both in conditions with edges aligned in some portions of the perimeter and edges not aligned in some other portions of the perimeter, it is necessary to adopt for the same nozzle a shape that is adapted both to be superimposed simultaneously and at least partially on two edges and to be superimposed at least partially on one edge and be arranged opposite one face, as shown in FIGS. **14*a*-14*d*. The mechanisms for performing the alternation of the arrangements are the ones as described of the first group, which therefore, in addition to having the function of following the nonplanar arrangement of the perimetric cavity have the function of moving transversely along the axis Z the nozzle 301** according to the type of the joint, portion by portion of the perimeter of the insulating glass, or between one insulating glass and another insulating glass if, as often occurs, insulating glass units with different shapes of the perimetric joints follow one another.

The possibility is also mentioned and claimed to arrange the mechanisms in double feedback, instead of as described in the preferred embodiment of the disclosure between the body 201 of the vertical carriage 200 which moves along the vertical axis V and the carriage 507 which moves along the transverse axis Z, rather proximate to the terminal part of the extrusion head 300 directly upstream of the nozzle 301 in order to obtain theoretically movements that are freer since they involve smaller masses and run on carriages which are miniaturized and therefore have a reduced friction. However, this solution is influenced by the noise introduced by the sealant feed tube, which despite being flexible entails loads which are additional and furthermore variable as a function of the type (as viscosity changes) and of the flow rate of the sealant 5 toward the nozzle 301 and therefore toward the protruding face of the larger glass pane.

Obviously, the industrial application is assuredly successful, since machines for the automatic execution of the second sealing of the insulating glass 1, 1', 1", 1''' have undergone particular development over the last decade, so much that the owner of the present application has already marketed over four hundred units, but since these automatic sealing machines have the severe limitations described in the background art section they are not suitable to deal with the continuous architectural evolutions of buildings, which require adaptations of all the elements that compose the buildings, in particular of insulating glass units and more particularly of structural insulating glass units.

Currently, the demand for types of insulating glass that are innovative both in terms of shape and in terms of structural and functional performance has undergone a surprising increase; it is sufficient to consider structural glazing, which extends over heights of more than one story of the building, or commercial insulating glazing, which reaches lengths of over 15 meters, and the consequence that the large extensions of the surface entail the use of equally important glass pane thicknesses and the use of glass pane configurations which range from tempered to laminated and accordingly their displacement from planar geometry, which is already per se present due to the large dimensions, is therefore even more significant due to the type. But most of all the configuration of the insulating glass units in which the peripheral edges are not aligned has undergone unexpected developments both in quantitative terms and in terms of types such as: the wide range of the offset values between the panes, which today is extended up to even 500 mm; the variety and combination of situations of aligned edge/offset edge situations within the same insulating glass; the quantity of panes within the same insulating glass, which is no longer limited to two as in the past; the variability of the surface treatments of the protruding parts of the larger glass pane. Moreover, the supporting structures of glazing units also have undergone evolutions in the shapes of the cross-sections and in the materials, such as steel and aluminum originally and now also including composites. And as already mentioned, the automatic sealing machine range according to the background art has turned out to be unsuitable for this parallel development of the insulating glass final product, or able to solve the problem only by means of predominantly manual palliatives.

The insertion of the present disclosure in the production line of the insulating glass is shown in FIGS. 17 and 18 (side view and plan view of a solution in which the work direction is from right to left), as obvious support to assured success in industrial application, in view of the by now established but always evolving diffusion of these lines.

Moreover, the machine according to the present disclosure can be implemented easily in existing lines, since as it performs the last work of the manufacturing process of the insulating glass it is a matter of replacing the obsolete machine with said innovative machine without altering the placement of all the upstream machines, intervening only on the terminal part of the line, therefore reducing sometimes to a single day the interruption of production in order to perform replacement or updates.

The disclosures in Italian Patent Application No. 102018000009336 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A machine for automatic sealing of a peripheral cavity of an insulating glass, the insulating glass including two glass panes having irregular planar geometry, a generally rectangular shape, and different rectangular dimensions, a spacer frame located in proximity of a perimeter of the smaller glass pane, the glass panes being stepped along a peripheral side, a total thickness of the insulating glass comprising a thickness of each glass pane, and of each spacer frame, the machine comprising:

a synchronous conveyor configured to support and displace, together with a synchronous suction cup carriage, the insulating glass along a horizontal axis during a sealing cycle;

a synchronous carriage with a chassis disposed on rails which extend along a pseudo-vertical axis V;

a sealing head disposed on the synchronous carriage, movable along a pseudo-horizontal axis orthogonal to the insulating glass to adapt to the total thicknesses of the insulating glass and to follow the non planarity of the glass panes composing the insulating glass, the sealing head being further rotationally movable so that a sealing nozzle is oriented tangent to the perimeter of the insulating glass, wherein the movement of the sealing head determines a relative movement between the insulating glass and the sealing nozzle, wherein the sealing nozzle is fed by a volumetric dosing unit assembly of bi-component or mono-component sealant compound;

wherein the assembly is constituted: for a bi-component case, by a dosing unit for a base compound and by a dosing unit for a catalyst compound, for a mono-component case by a single dosing unit, which respective flow rates are controlled by:

a) a stoichiometric dosing ratio, in the case of the bi-component compound;

b) dimensions of the cavity of the peripheral edge defined between the glass panes and an extrados of the spacer frame;

c) a relative speed between the sealing nozzle and the perimeter of the insulating glass, so that to fill the cavity until an edge of the smaller glass pane;

wherein the machine further comprises a controller;

wherein the machine further comprises the following devices, all located in the synchronous carriage: an actuator; mechanical transmissions; a support; a pneumatic cylinder/compensator; a joint with a joint carriage; and a transducer, wherein the machine further comprises a sensor located in the sealing head, operating in connection with a location of the peripheral cavity of the insulating glass to allow the sealing nozzle to follow the location of said cavity based upon the non planarity of the insulating glass, with control of position and also with control of force of the nozzle against a face of the larger glass pane where the larger glass pane is offset.

2. The automatic machine according to claim 1, wherein the actuator; the mechanical transmissions; the support; the pneumatic cylinder/compensator; the joint with a carriage; the transducer, and the sensor carry out also a further movement of the nozzle, along a transversal axis, with respect to the cavity of the insulating glass so that in portions of the perimeter where the glass panes are aligned, parts of the nozzle which must have the function of tightening of the sealant overlap margins of the glass panes that define, together with the spacer frame and with the nozzle, the space where the sealant has to be injected.

3. The automatic machine according to claim 1 wherein the nozzle is connected to the sealing head through a spherical joint to orient sealing contacts towards the margins of the glass panes in spite of possible geometric irregularities of margins of the glass panes and of a non planarity of a geometry of the insulating glass.

4. The automatic machine according to claim 1, wherein the glass panes and consequently the insulating glass can have shapes: rectangular, polygonal, curvilinear, mixed.

5. The automatic machine according to claim 1, wherein the glass panes, when the glass panes are more than two and therefore the cavities defined between the glass panes are more than one, the perimeter of the insulating glass is traveled by the sealing head during multicycles, the sealing nozzle is positioned and fills one cavity of the cavities at a time with a secondary sealant.

6. The automatic machine according to claim 1, wherein the sensor sends to the controller a signal proportional to a reciprocal position between the pneumatic cylinder and an inside mobile piston and the controller processes an output towards the actuator so that to maintain effective the contact of a part of the nozzle operating against the face of a stepped part of the larger glass pane, as the piston internal to the pneumatic cylinder runs constantly a practicable field as far from a positive or negative end of stroke.

7. The automatic machine according to claim 1, wherein mechanisms actuating a double feedback, one for a control of a centering towards the location of the cavity of the insulating glass, one for the control of the force implemented by a part of the nozzle in contact with the face of the larger glass pane in the portions where the larger glass is offset, instead of acting by moving the carriage are located in the sealing head and act in proximity of the nozzle.

8. Method for the automatic sealing of the peripheral cavity of the insulating glass, which geometry is irregular in planarity in comparison with the theoretical location, carried out in the machine according to claim 1, wherein the sealing nozzle follows without solution of continuity not a theoretical location but a real location of such cavity, with control of position and also with control of force performed by a part of the nozzle against the face of the larger glass pane in the portions of perimeter where the larger glass pane is offset.

9. The method according to claim 8, wherein the nozzle is actuated along a transversal direction Z, with the further movement with respect to the cavity of the insulating glass so that in portions of the perimeter where the glass panes are aligned, parts of the nozzle which must have the function of tightening of the sealant overlap margins of the glass panes that define, together with the spacer frame and with the nozzle, the space where the sealant has to be injected.

* * * * *